(12) United States Patent
Taub

(10) Patent No.: US 10,560,664 B2
(45) Date of Patent: *Feb. 11, 2020

(54) ENTRANCEWAY OR FOYER-BASED, COMMUNICATION APPARATUS AND SYSTEM

(71) Applicant: MVI Systems, LLC, Brooklyn, NY (US)

(72) Inventor: Samuel S. Taub, Brooklyn, NY (US)

(73) Assignee: MVI Industries, LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,546

(22) Filed: Oct. 22, 2018

(65) Prior Publication Data

US 2019/0058851 A1   Feb. 21, 2019

Related U.S. Application Data

(63) Continuation of application No. 15/623,502, filed on Jun. 15, 2017, now Pat. No. 10,158,831.

(51) Int. Cl.
| | |
|---|---|
| *G07C 9/00* | (2006.01) |
| *H04N 7/18* | (2006.01) |
| *G07C 1/02* | (2006.01) |
| *H04N 7/14* | (2006.01) |
| *G06Q 30/02* | (2012.01) |
| *H04Q 9/02* | (2006.01) |
| *G07C 1/10* | (2006.01) |
| *G06F 3/0488* | (2013.01) |

(52) U.S. Cl.
CPC ......... *H04N 7/181* (2013.01); *G06Q 30/0241* (2013.01); *G07C 1/02* (2013.01); *G07C 9/00119* (2013.01); *G07C 9/00158* (2013.01); *H04N 7/142* (2013.01); *H04N 7/147* (2013.01); *H04Q 9/02* (2013.01); *G06F 3/0488* (2013.01); *G07C 1/10* (2013.01)

(58) Field of Classification Search
None
See application file for complete search history.

(56) References Cited

U.S. PATENT DOCUMENTS

| | | | |
|---|---|---|---|
| 3,662,112 A | 5/1972 | Martin | |
| 5,412,708 A | 5/1995 | Katz | |
| 5,428,388 A | 6/1995 | von Bauer | |
| 5,774,052 A | 6/1998 | Hamm | |
| 5,923,363 A | 7/1999 | Elberbaum | |
| 6,084,367 A | 7/2000 | Landert | |
| 7,263,182 B2 | 8/2007 | Allen | |
| 8,160,221 B2 | 4/2012 | Henderson | |
| 10,158,831 B1 * | 12/2018 | Taub | H04N 7/181 |
| 2009/0141117 A1 | 6/2009 | Elberbaum | |
| 2011/0071951 A1 | 3/2011 | John | |
| 2014/0040054 A1 | 2/2014 | Elhabr | |
| 2014/0152831 A1 | 6/2014 | Yang | |
| 2016/0247340 A1 | 8/2016 | Mahar et al. | |

* cited by examiner

*Primary Examiner* — K. Wong

(57) ABSTRACT

The invention is a digital doorman-like and communication system comprising a small-footprint, software-driven, controller device that is intuitively operable and which also communicates with wireless tenants' mobile devices, and based thereon, controls access to the building entranceway area, distributes information to management and to tenants and communicates flexibly including via voice, video, messaging and the like.

19 Claims, 9 Drawing Sheets

ENTRANCEWAY OR FOYER-BASED, COMMUNICATION APPARATUS AND SYSTEM

CROSS-REFERENCE TO RELATED APPLICATION

The present application is a continuation of prior U.S. patent application Ser. No. 15/623,502, filed Jun. 15, 2017 in the name of Samuel S. Taub, and entitled "ENTRANCEWAY OR FOYER-BASED, COMMUNICATION APPARATUS AND SYSTEM," the entire contents of which are incorporated herein by reference.

BACKGROUND OF THE INVENTION

The present invention is generally directed to multi-dwelling, apartment-building automation and, more particularly, to an automated, smart, electronic and multi-purposed doorman-like system that is focused on providing remote monitoring of apartment renters' compliance with rental regulations and agreements, improved access to the building lobby area to residents, visitors, delivery persons and maintenance people, improved intercom capabilities between apartment dwellers and the entranceway or foyer area using visual and audio interactive systems, and improved communications between building operators and persons entering their buildings.

Conventional products and tools currently utilized by multifamily building operators to monitor activity in and around building entranceways and foyers, e.g., using video cameras and standard intercom systems, provide only very basic audio visual tracking of building entryway traffic. The existing systems are inadequate, particularly with the recent explosion of renters engaging in illegal subletting of apartments, for example, through the widely known AIRBNB service which tempts and allows renters to violate their rental Agreements and exposes other dwellers in the building to strangers, and occasional visitors whose credentials to live, roam through and use the building's common facilities have not been properly investigated.

In addition, the existing systems are rather cumbersome, require labor intensive security and access control, and provide little oversight or monitoring of maintenance in building and scarce technology for tracking/interacting with tenants.

Also, the primitiveness of existing systems results in inefficient, decades old intercom technology being utilized, deliveries being left unattended in the lobby or at nearby pay services, and the use of keys and fobs that are prone to being lost and expensive to replace.

To the present inventor's knowledge, existing systems lack the technology to assist in tracking/interacting with visitors, which results in missing important guests, and an inadequate tracking of children and dog walkers and a lack of more efficient communication with management regarding both building management and maintenance issues.

Several vendors presently provide entranceway-based, doorman-like systems, as well as communication platforms with some similar features to the present invention. Among these existing systems are those that are advertised on-line and known as: Amazonlocker (www.amazon.com); August (www.august.com); Buildinglink (www.buildinglink.com); Buildingsnitch (www.buildingsnitch.com); Butterflymx (www.butterfly.com); Gateguard (www.Gateguard.xyz.com); Kisi (www.getkisi.com); Latch (www.latchaccess.com); Lockitron (www.lockitron.com); Packageconcierge (www.packageconcierge.com); Skybel (www.skybel.com); Subletalert (www.subletalert.com); Subletspy (www.sublet.spy.com) and Virtualdoorman (www.virtualdoorman.com); as well as others.

With further reference to the prior art, U.S. Patent Publication US 2009/0141117 describes a method and apparatus for providing lockers in multi-apartment buildings connected via an interface to a video interphone system via a local guardsman or a virtual guardsman over a network.

U.S. Patent Publication US 2016/0247340 describes an automation system for a building lobby which observes guests to residents, predicts a user profile associated with the guest and invites an administrator from an automation system to create a profile of the guest. The system stores biometric identifiers with a visitation pad and determine if the guest requires a profile.

U.S. Patent Publication 2011/0071951 is directed to a system for monitoring occupancy of a rental property and its focus is primarily to detect, for example, by monitoring the usage of utilities, whether a tenant is actively occupying a rental property such as an apartment.

U.S. Patent Publication 2014/0040054 is directed to a housing services Kiosk which is primarily focused on an electronic system for leasing and services for multi-family residential housing. It enables tenants to make rental payments or for third parties to view available apartments and communicate with the leasing agency.

The contents of the aforementioned United States publications are fully incorporated with the reference herein.

SUMMARY OF THE INVENTION

Accordingly, it is an object of the present invention to provide a smart, digital doorman-like system that avoids the aforementioned and other drawbacks of the prior art.

It is another object of the present invention to provide a visual and highly interactive system for multi-apartment buildings that is provided as a compact, small footprint, entranceway-based electronic doorman-like device, referred to herein as the building's communication Kiosk.

The foregoing and other objects of the invention are realized by a digital doorman-like and communication system comprising a small-footprint, software-driven, controller device that is intuitively operable and which also communicates with wireless tenants' mobile devices, and based thereon, controls access to the building lobby area, distributes information to management and to tenants and communicates flexibly including via voice, video, messaging and the like.

In a preferred embodiment, the invention comprises a kiosk-like communication system, comprising: a housing comprising an interior and a front face, the interior being configured to hold electronic circuits associated with operational algorithms for functionalities involving a multi-apartment building (MAB); attachment hardware for mounting the housing to a support structure located at an entranceway comprising a foyer or a publically accessible area of the MAB; a display mounted at the front face of the housing, the display being configured to display information to tenants, owners of and visitors to the MAB, the display incorporating a touch sensitive interface to allow tenants and visitors to enter information for the operational algorithms; a camera system for providing visual information of at least the entranceway; door closing and opening hardware coupled to the electronic circuits for closing and opening an entrance door of the MAB; a CPU associated with the electronic circuits for executing software algorithms to effect at least the following functions: a) validating persons to be permitted entry into the MAB; b) unlocking the entrance door into the MAB; c) preparing reports and communicating said reports to management personnel located offsite the MAB, regarding activities associated with the MAB; and d) visually identifying persons who request entry into the MAB.

The preferred embodiments of the invention may further comprise or be such that the CPU and software algorithm are located inside said housing, or outside said housing or be cloud-based. The kiosk-like communication system includes a facility for identifying persons, using previously entered biometric information for persons requesting entry into the MAB. It may further include a facility for counting the number of persons entering and leaving the MAB over given time periods, and include a time-clock facility for allowing visitors to enter a time of arrival and a time of departure from the MAB, and include an intercom communication system, wherein the intercom communication system is configured to allow residents/tenants of the MAB to communicate with persons located at the entranceway of the building via an audio system included in the housing.

According to further preferred embodiments, the camera system includes multiple cameras located at the entranceway at different height levels, a facility for communicating with a mobile communication device and for allowing entry into the MAB based on the system being able to sense that the mobile electronic device is located at the entranceway of the MAB, and an electronic eye system to sense each person crossing the entranceway into said at least one door. There may also be included, a human interaction facility that allows management personnel located remotely from the MAB to communicate with persons located adjacent the housing, either by audio or by video communications, a facility for displaying advertising content on the display, and a facility that allows local merchants to display advertising copy directly on the display of the MAB.

The report generating facility is preferably configured to provide reports of at least two of the following functions: 1) utility meter readings associated with the MAB; 2) exceptional usages of utility services; and 3) alarms set for water, electricity and HVAC parameters. The system may include, movement detectors located at a variety of locations in the MAB and said detectors communicating with said electronic circuits and providing indications to management of movements of humans at said variety of locations based on pre-determined criteria. It may further provide door ajar reports. The camera system may include cameras located in elevators of the MAB, a facility for qualifying and validating temporary visitors to the multi-apartment building and cameras located in hallways of the MAB and in the entranceway of the MAB and allowing tenants to track the movements of children from individual tenant apartments through the entranceway and onto a street on which the entranceway is located.

Other features and advantages of the present invention will become apparent from the following description of the invention which refers to the accompanying drawings.

DETAILED DESCRIPTION OF EMBODIMENTS OF THE INVENTION

In the detailed description below, the term "Kiosk" shall have its ordinary English meaning and shall designate generally a small structure located in a public area used for providing information or displaying advertisement, often incorporating an interactive display screen or screens. In the description below, the term Kiosk is used somewhat more broadly to include an additional functionality as described below.

Figure 1:
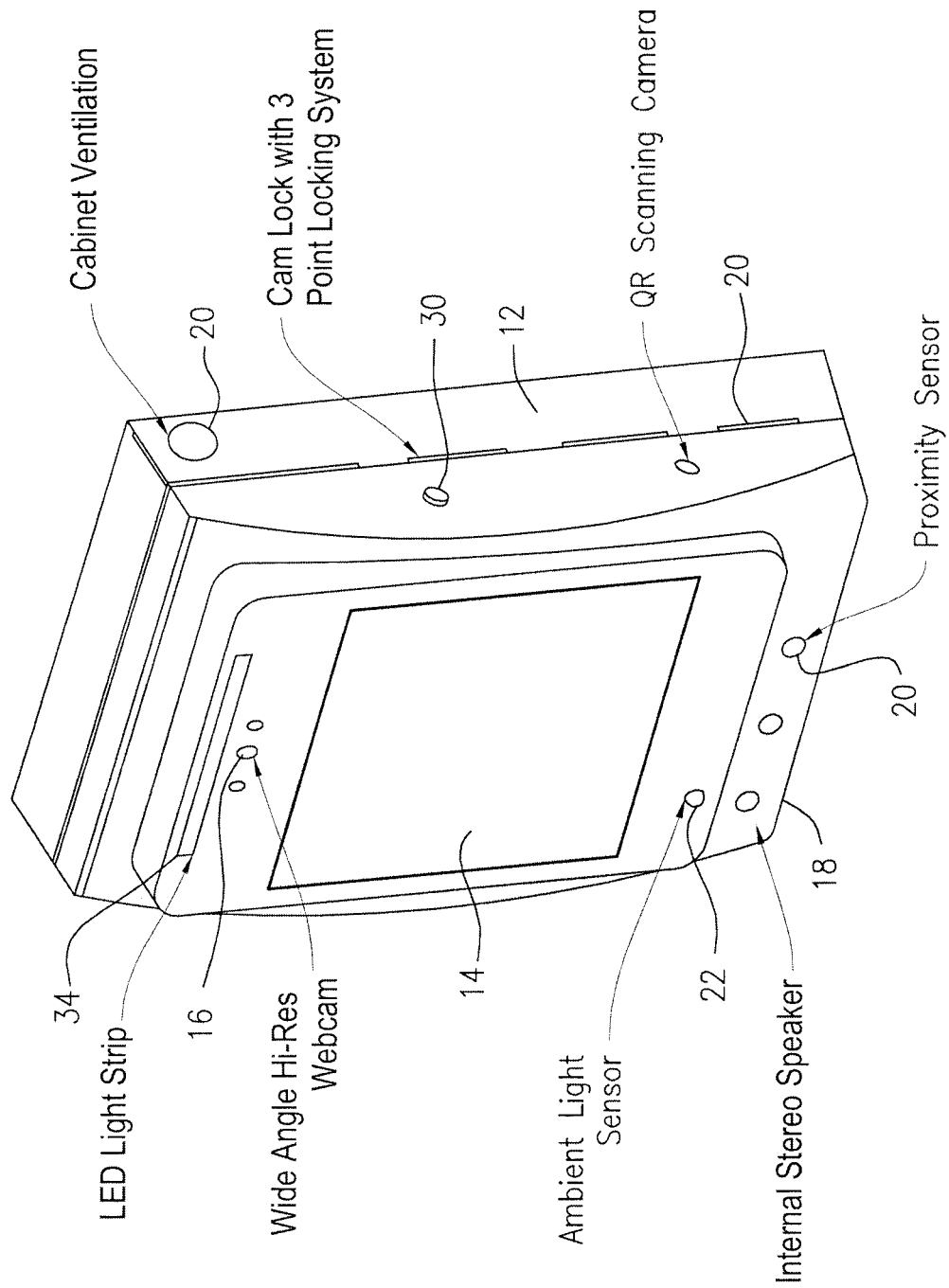
FIG. 1 is a perspective showing the housing of an interactive communication and monitoring Kiosk in accordance with the present invention.

Referring to the drawings, the communication Kiosk 10 of the present invention is intended to be located external to or in the foyer, close to the entranceway, of a multi-dwelling apartment building or the like, and it can be installed by being affixed to a wall or to a desk based pedestal or the like. Referring to FIG. 1, the communication Kiosk 10 has an openable housing 12 with a display screen 14, preferably touch sensitive, the housing 12 supporting a wide angle high resolution web cam 16, stereo speakers 18, proximity sensors 20, ambient light sensors 22 and local area lighting 24, which may comprise an LED light strip. Internal electronics located in the housing 12 may be cooled by drawing air via a cabinet ventilation port 126.

Figure 2:
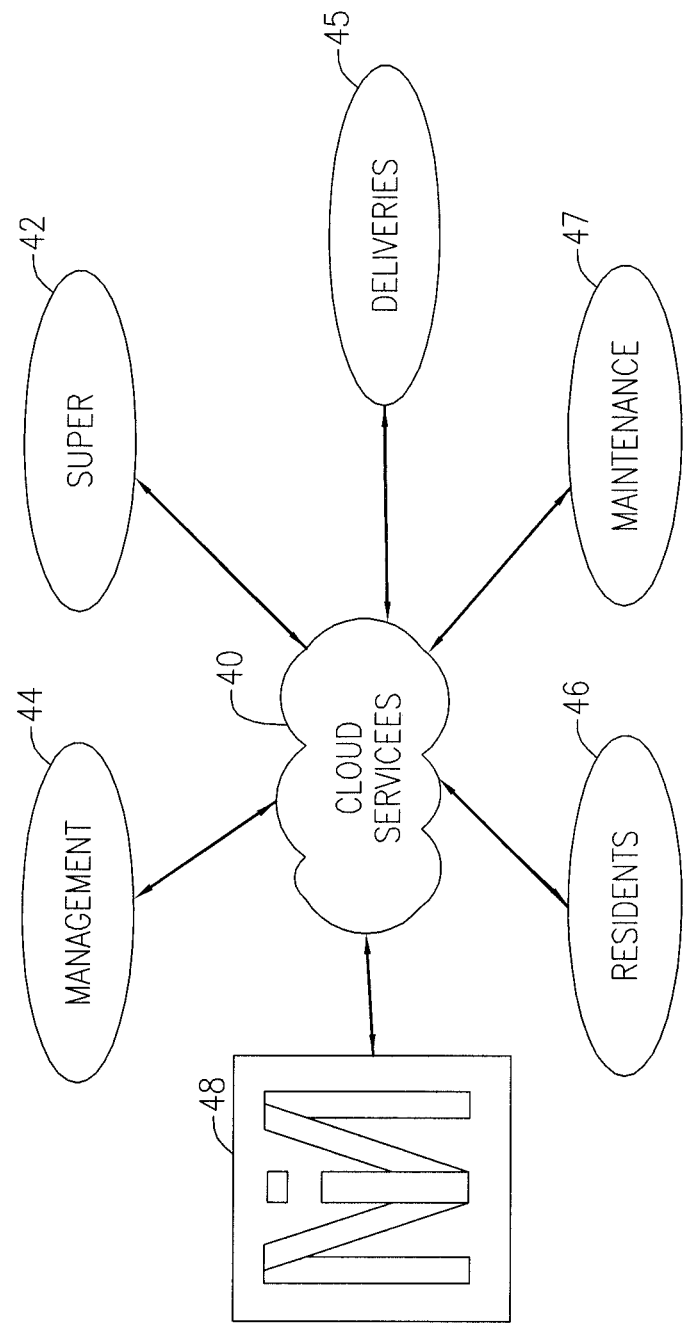
FIG. 2 diagrammatically illustrates various parties and entities communicating with the communication Kiosk of the invention.
Figure 2A:
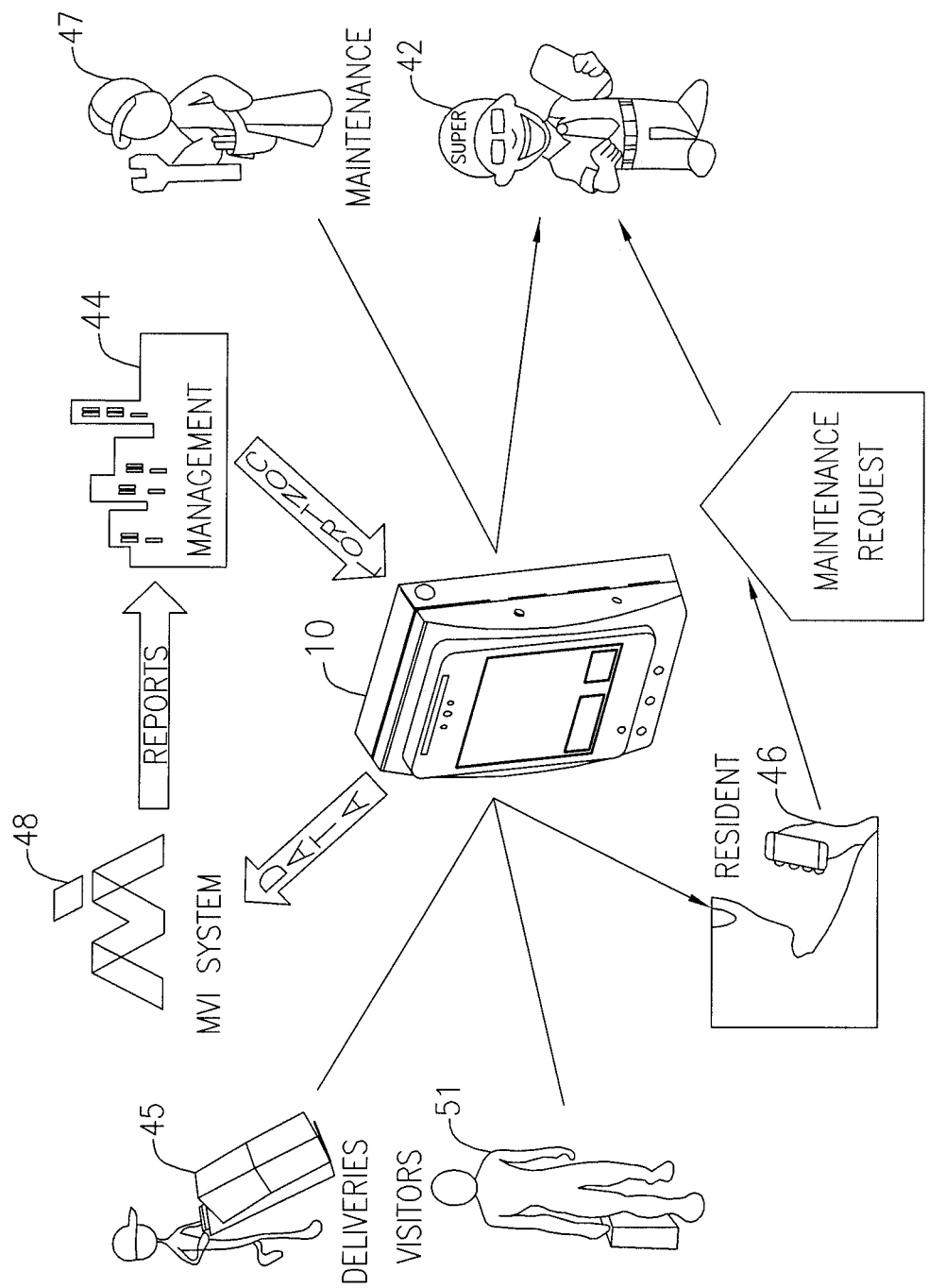
FIG. 2A is a further diagrammatic illustration of the communication setup of the invention.

The communication Kiosk 10 is intended to be, as diagrammatically depicted in FIG. 2, a cloud-services enabled device that communicates with various handheld, wireless communication devices, e.g., cell phones, tablets, mobile computers, etc. under control of an overall controlling facility 48 that provides oversight over the software operations of the communication Kiosk 10, and through the operations thereof provides communication reports or receives information from various entities including from: a building super 42, a building management 44, residents 46, maintenance personnel 47 and delivery services 45. This is further diagrammatically illustrated in FIG. 2A showing the communication Kiosk 10 in communication with and sending data or receiving information from the aforementioned entities including visitors 51.

As shall be elaborated upon further on, the overall functionality of the communication Kiosk 10 is to communicate with building residents' mobile devices that have been pre-loaded with application software for communicating with the Kiosk and thereby verify and authenticate residents and then open the main building door to allow entrance to residents. The Kiosk 10 can also communicate with a regular landline or cellular number, and allows residents access by dialing a digit on the keypad. However, the communication Kiosk 10, via its touch screen and voice communication, can be approached directly to provide that authentication and entry into the building function, as well as intercom communication with residents. Thereby, residents, from any location in the world via their phone device, can effectively "buzz-in" visitors. Tenants and management personnel can also remotely control access to the building including to delivery people and the like. There is also the ability to gain entry via a QR (Quick Response) code that can be displayed to the scanner on the Kiosk 10, and will be granted entry via those credentials.

While a single housing 12 with a single camera is illustrated, it is within the overall concept and ambit of the present invention that there may also be placed several other cameras communicating wirelessly with the communication Kiosk 12. These cameras can be located on posts interspersed in front of the main entrance door into the building lobby and thereby have people's photos taken and automatically authenticated without approaching or having to manually engage the physical housing of the Kiosk 10. This would prevent unnecessary queues in front of the communication Kiosk 12, enabling residents to be quickly screened and allowed entry with practically no delay at all. That is, the cameras would automatically transmit the photos of the residents to the communication Kiosk 12 and the application software will then automatically be launched in the phones of the residents and the authentication process completed without any manual steps.

Although not shown, it may be an option of the invention that an electronic eye mechanism in front of the main door "counts" the number of people who have entered when a particular resident has been approved for entry so that only a single person crosses the main entrance door when it opens. Alarms may be sounded when needed.

Figure 3:
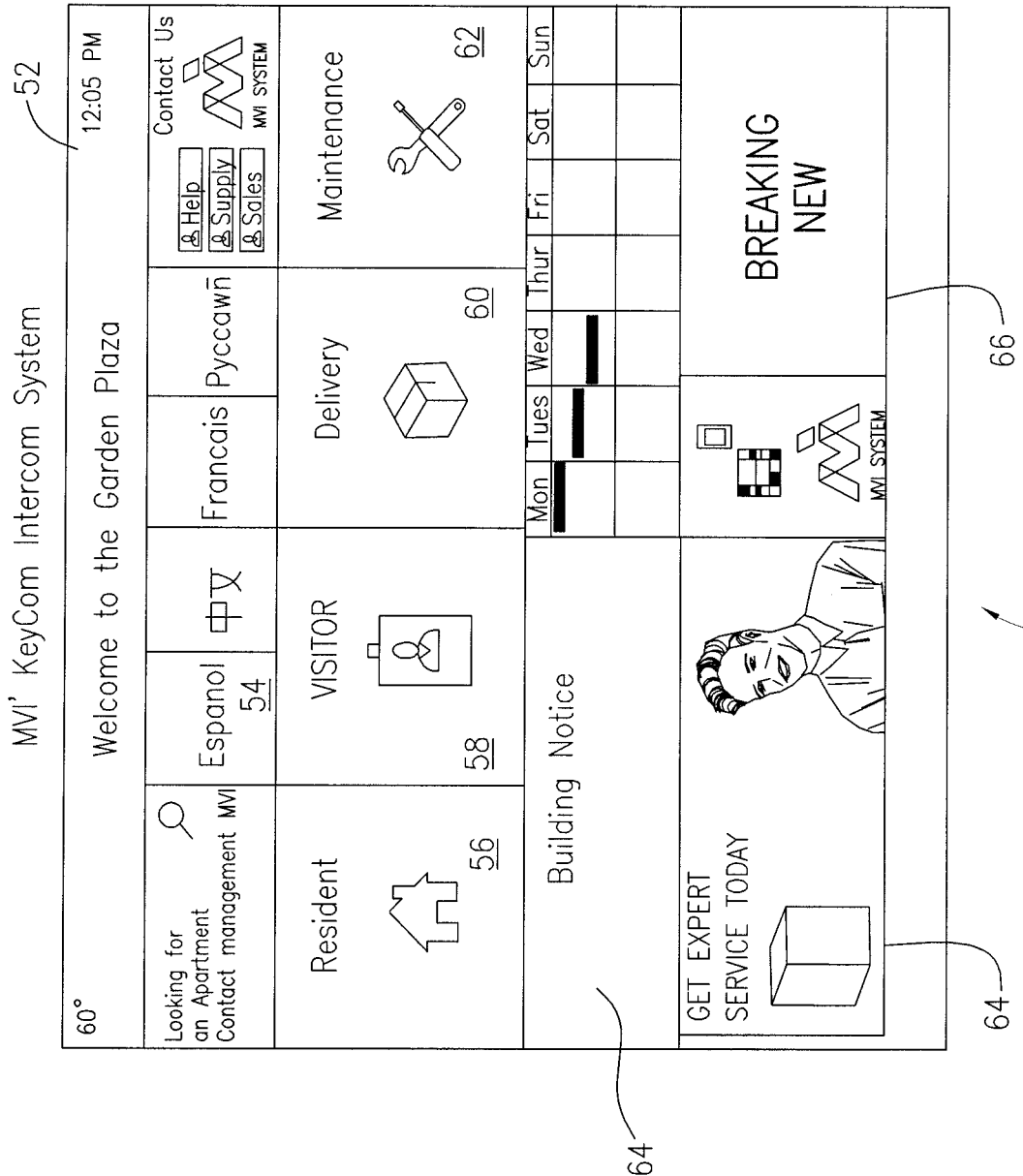
FIG. 3 is a diagram of a screen viewable on the communication Kiosk of the present invention.

With reference to FIG. 3, it should be understood that a great deal of communication information is exchanged or provided through the touch screen 14 on the communication Kiosk 10 and one exemplary screen layout 50 may comprise a header banner 52 identifying the particular building, input dialog boxes 54 for selecting a language of communication, touch pads 56 for identifying residents and touch pads 58, 60 and 62 for being used by visitors, delivery or maintenance people. News information can be streamed at a portion of the screen identified at 66 and advertisement can be provided at 64, which supports the quest of making the communication Kiosk of the present invention a financially attractive system and apparatus to install by building owners.

Figure 4:
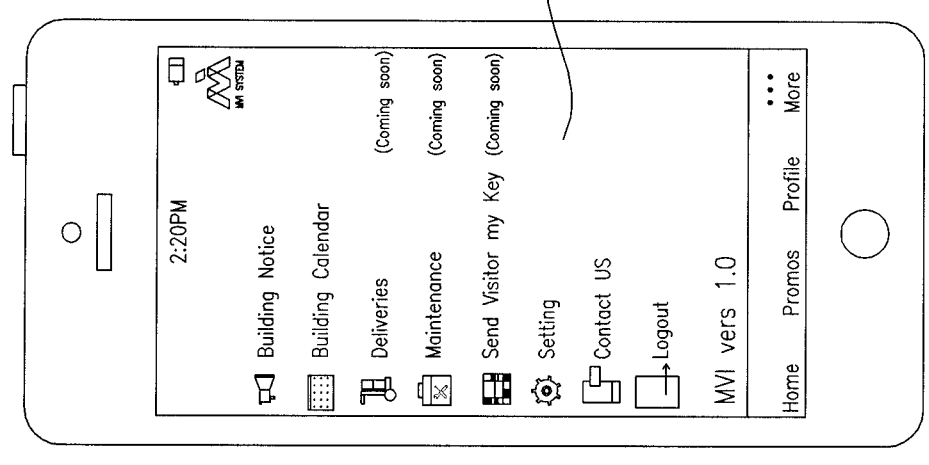
FIG. 4 is a diagram showing handheld devices and screen shots that appear on these wireless communication devices that communicate with the communication Kiosk of the present invention.
Figure 4:
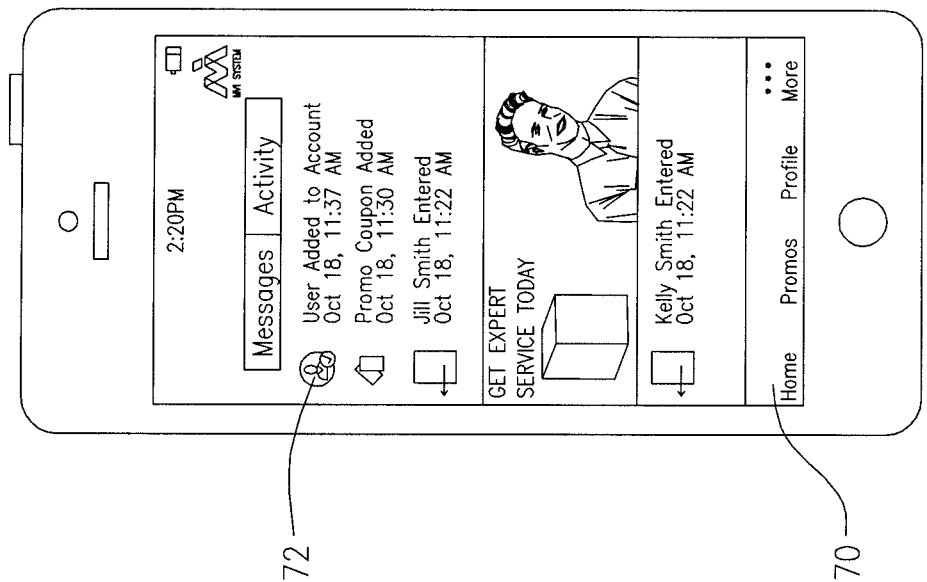

As can be appreciated, it is intended that residents, visitors and the like could communicate with the communication Kiosk 10 through the touch screen 14. However, and as illustrated in FIG. 4, the internal hardware/software construct (to be described) that drives the communication Kiosk 10 is intended to communicate via the worldwide web (www) with wireless devices 70 that have been pre-loaded with application software that allows them to communicate with the system, thereby allowing residents and other building visitors to communicate via screens 72, 74 with the system of the present invention. The wireless devices may be iOS devices, Android devices, PDAs, laptops or any portable communication devices, enabling exchanging of information, transmission of video and audio information as well as tracking information that is being processed, handled and analyzed by the communication system in the Kiosk 10.

Figure 5:
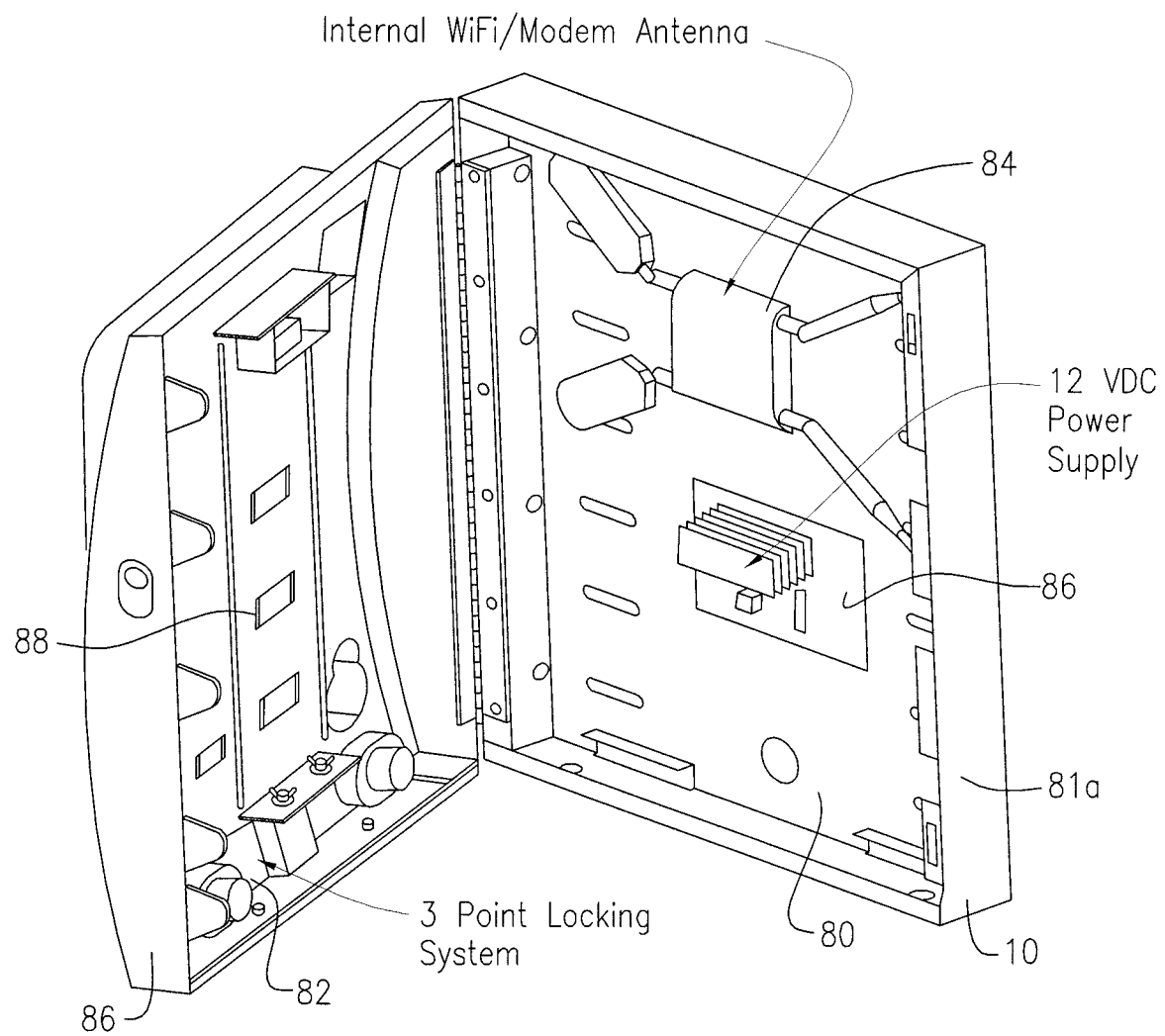
FIG. 5 perspectively illustrates internal components of the Kiosk of the present invention.

Overall, the communication Kiosk 10 is, as shown in FIG. 5, rather small in size which means that it leaves only a small footprint on a wall or on a desktop at the entranceway to a building, for example, on the order of the size of a tablet, laptop or the like. Thus, the communication Kiosk 10 has an interior space comprising hingedly connected housing halves 81a and 81b that are securely locked through a three point locking system 82. The Kiosk electronics 88 is housed on one side and the various internal systems and electronics can be powered by a 12 Volt DC power supply 86. External communications can be provided via an internal WI-FI, ethernet, or cellular modem antenna system 84.

Figure 6:
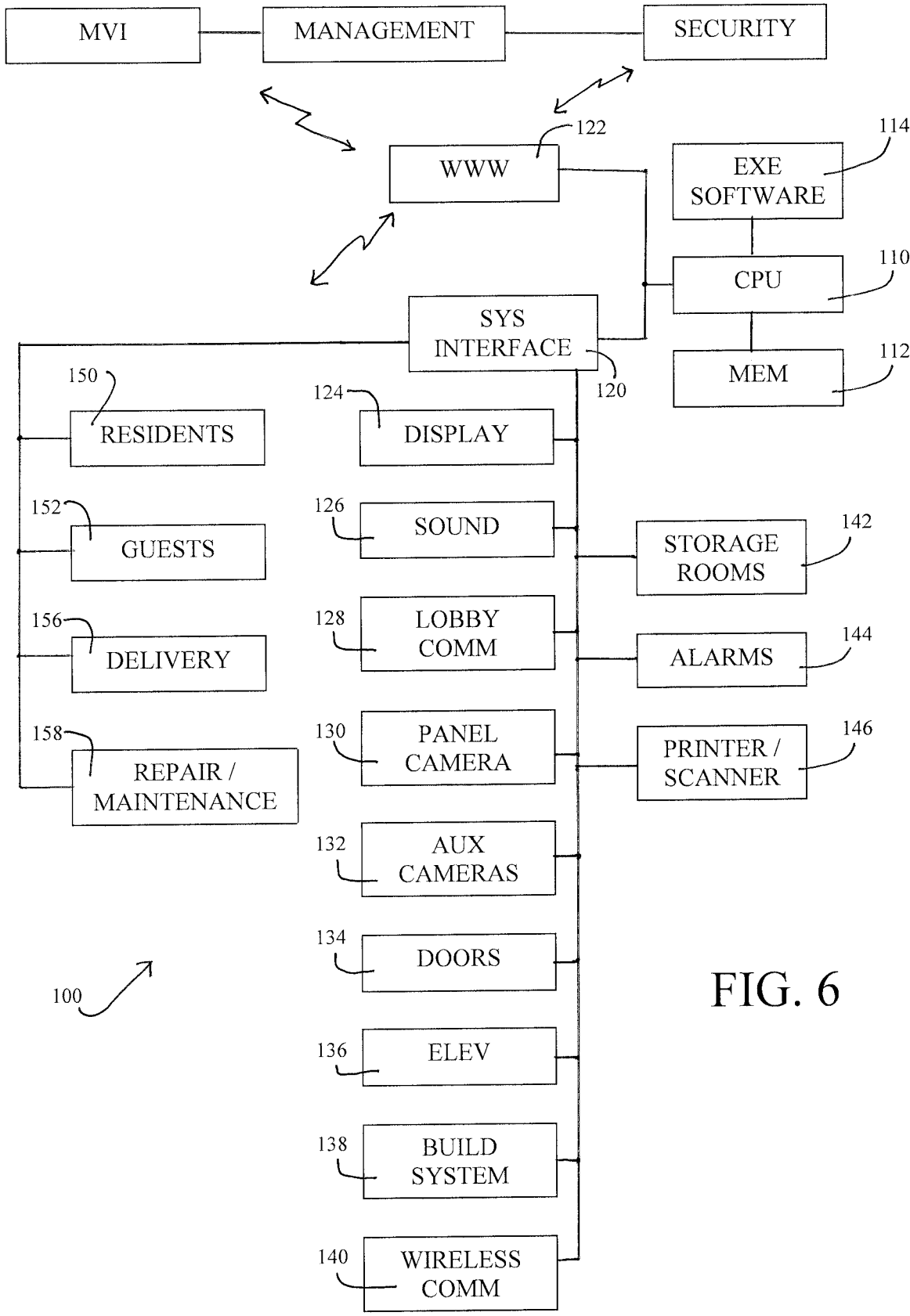
FIG. 6 is an overall block diagram illustrating hardware/software constituents of the overall system utilized with the Kiosk of the present invention.

Referring to FIG. 6, the communication Kiosk 10 of the present invention essentially comprises a software-controlled system 100 that includes at least one CPU 110 operating with various memories 112 that store executable software programs/modules 114 that collect, generate and provides data and information. Computer systems of this nature are widely known in the art and do not require any explanation herein. It is noted though that for the purposes of the present invention, the CPU/controller 110 can communicate with various other systems, both through cloud services as indicated by the worldwide web block 122 and via local system interfaces 120.

Accordingly, the system interface 120 communicates and exchanges information with the CPU 110 relative to the display 124 which can include several auxiliary displays at the entranceway, as well as the display 14 (FIG. 1), various sound systems 126, including sound systems located on individual cell phones or sound boxes (not shown) installed in the apartments, to enable entranceway or foyer communications systems 128, for example, through the stereo speakers 18 (FIG. 1).

The system interface 120 also provides communications with various camera systems including a panel camera 130 and auxiliary cameras 132 (described in more detail further on), various door ajar sensors 134 as well as elevator systems including elevator cameras 136, building systems 138 (heating, ventilation, etc.) and the wireless communications systems 140. The system interface 120 also provides a communication link to the CPU 110 to optional storage rooms 142, alarms 144 and a printer/scanner 146 that may be interfaced to the CPU 110. Thereby, the Kiosk 10 enables residents 150, guests 152, delivery personnel 156 and repair maintenance people 158 to communicate either directly via the system 120 (or via the worldwide web interface 122), to provide information to the CPU 110 and to establish voice communications between residents etc. and the system 100 and/or live conversations with management, as well as receiving live feed of video footage produced by the various cameras and sensors. Lastly, the worldwide web interface 122 enables communication by the master controller (MVI) 48 which can request reports to be sent to management and to security personnel.

Figure 7:
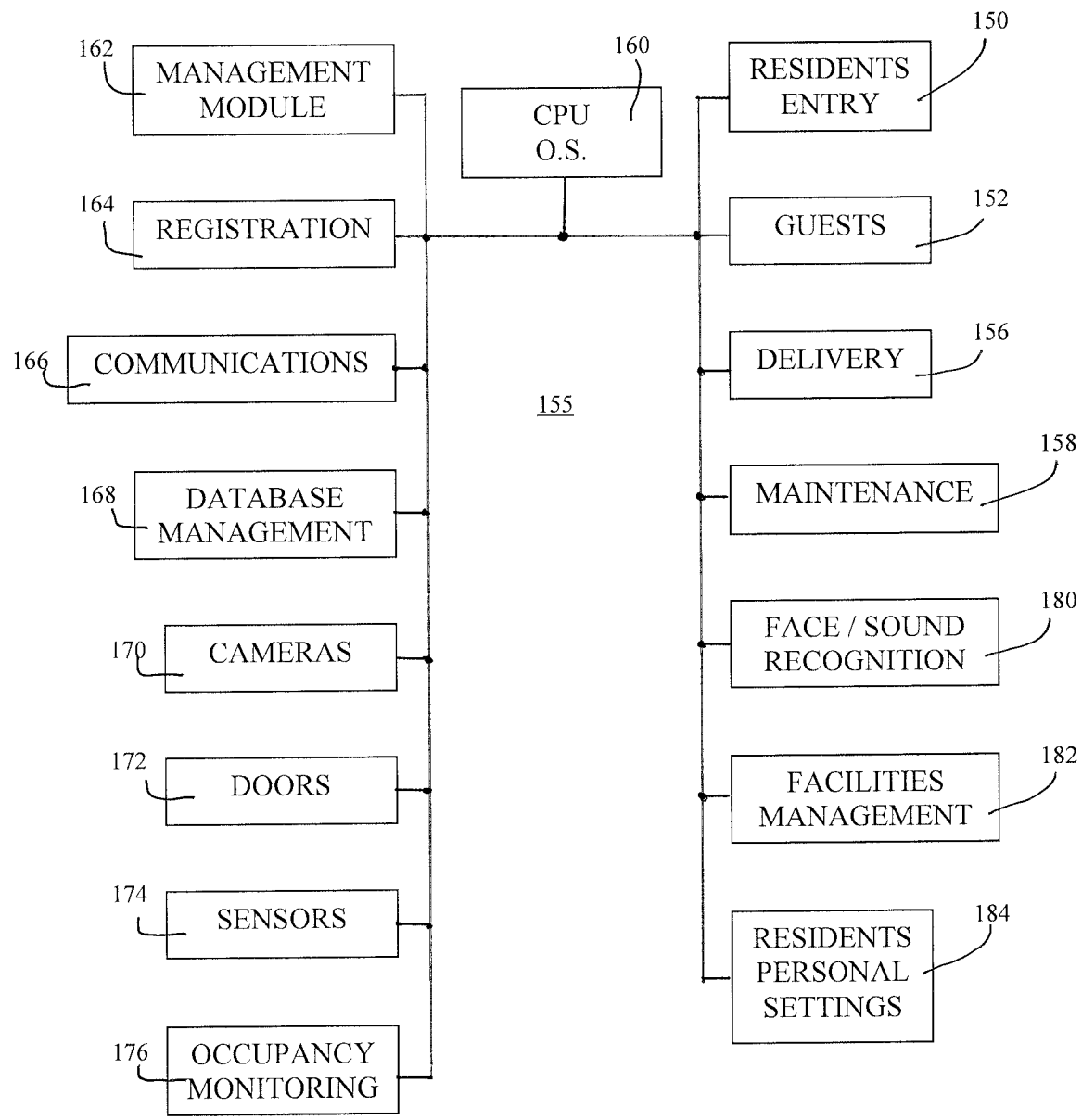
FIG. 7 shows software components/modules of the system associated with the Kiosk of the present invention.

As shown in FIG. 7, the executable software 155 of the present invention interacts with the CPU operating system 160 and can include various software modules including a management module 162, a user registration module 164, a communications module 166 and a data management module 168. The software 160 also interacts with camera controlling modules 170, with door systems 172 and the various sensors 174 including an occupant monitoring module 176 to obtain functionalities described further on.

As previously noted, residents 150 as well as guests, delivery and maintenance personnel (152, 156, 158) also interact with the software 155. The software system optionally includes facial and sound recognition software modules 180 and management software modules 182 to manage the building facility and residents' personal data and preferences setting software 184, so residents can provide to the software 155 personal data, e.g., time slots when guests are not allowed, photos of guests and the like.

Figure 8:
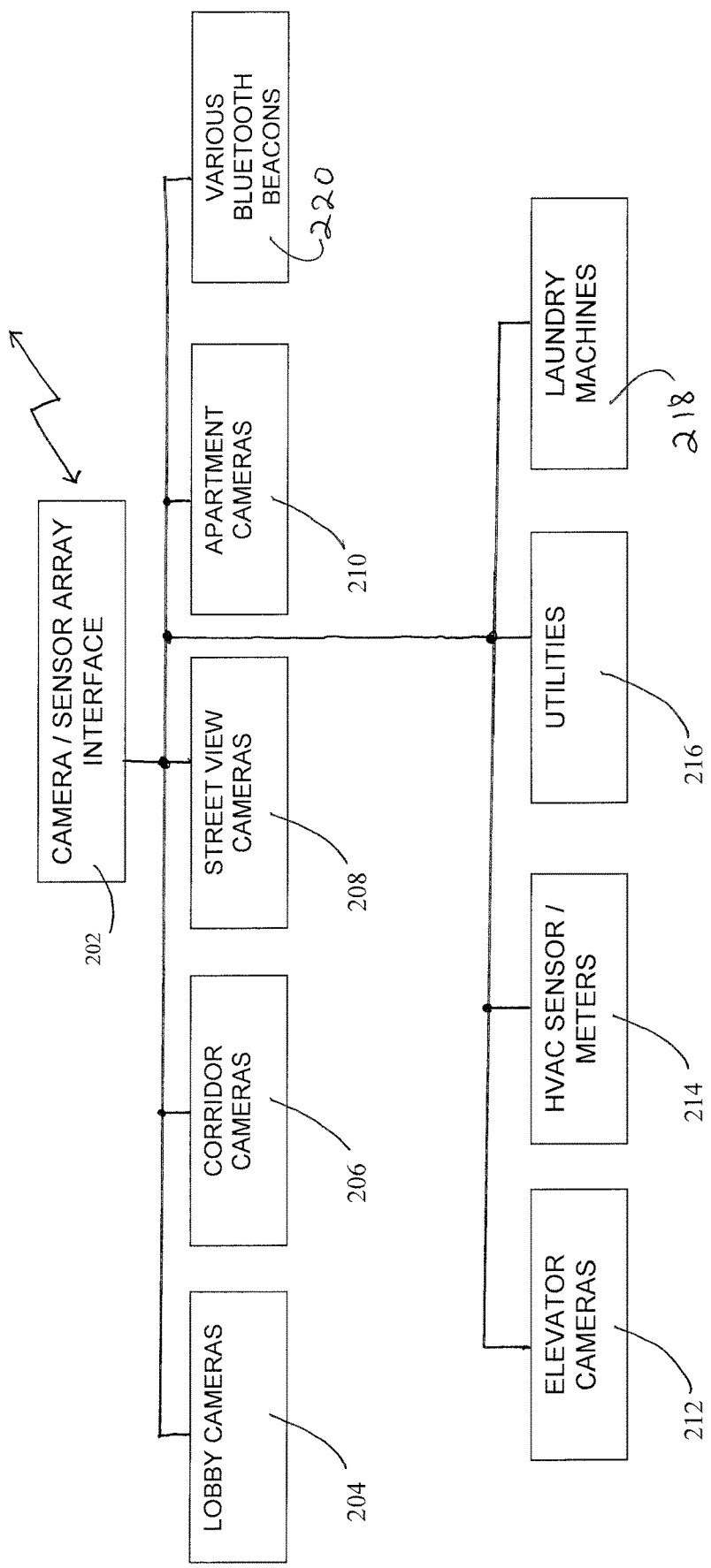
FIG. 8 is a block diagram of various sensory information that is fed to the Kiosk of the present invention to be shared by multiple parties.

The camera and sensor array interface 200 depicted in the block diagram of FIG. 8, includes the interface hardware 202 which receives inputs and can exchange messages with lobby or entranceway cameras 204, corridor cameras 206, street view cameras 208 and optional (and resident enable) apartment cameras 210. The camera system also can interface with elevator cameras 212. In addition, the interface system 202 receives inputs or can provide information that is obtained from HVAC sensors and meters 214, utility meters 216, laundry machines 218 and various Bluetooth beacons 220.

The system of the present invention thereby provides the many functions and facilities, information, and data that provide to both the management and the residents of a multi-dwelling apartment building intercom communications via the Kiosk 10 from the entranceway or foyer to the individual apartments, the streaming of advertising on the main display 14 at the entranceway, mobile communication by tenants and management via wireless technology such as Apple IOS, or native apps or Android native apps, mobile view web responsive facilities, Blue Tooth, Web RTC communication and the like.

Thereby, the software facilities and hardware system of the present invention provides a solution that stops illegal subletting and illegal Airbnb use, through monitoring and comparing photos of persons who enter the building to pre-stored photos of residents of the building. In addition, residents are able to, through their wireless devices, or at the Kiosk 10, to send to the system photos of guests and indicate parameters about when those guests will be permitted entry, creating an automatically operated entry system into the building including providing access to the individual apartment.

Maintenance people can enter all their information including the type of work done such as repairs and maintenance activities and all that information is automatically sent to management. The scheduling of maintenance and repairs can be enhanced by the system of the present invention.

For tenants, the system of the invention provides the advantages that tenants no longer have to carry keys or fobs that are easily lost and instead have their wireless phones or a QR tab, to be used as building entry fob or key. In fact, the tenants can answer a call from the entranceway or foyer to their apartments from anywhere in the world and also have "face time" style, video communication with visitors at any time. The system enables tenants to grant access to important visitors, for example, to family or to dog walkers and the like, while away from home. Tenants can authorize the system of the invention to receive video from their apartment installed cameras, which videos are then routed to the tenant wherever they happen to be. Similarly, the system also allows tenants to receive and track package deliveries. The delivery services can access a metal lockbox in the lobby, via the Kiosk 10 with their credentials, and then place the packages within. The tenants would then receive an alert that they have a package delivered, and can open the lockbox with their phone app. The tenants can also choose to leave packages at the lobby for pickup and the system of the present invention allows a delivery man to scan and leave information through the system 10 to the tenant that the package has been picked up. The system allows video access to building notices and schedules. Tenants have direct connection with management regarding maintenance issues.

Tenants can request streaming of the building cameras images to their individual wireless devices, whereby a parent can track a child as the child enters an elevator, and watch the child at the entranceway or foyer, and at the same time also monitor the arrival of a school bus via the street-view cameras of the building. Thus, child safety and parent convenience are greatly enhanced, including because the parent does not need to stand for a long period outside waiting for a school bus, but can actually watch the school bus arriving and only then, enter the elevator with the child to meet the bus. Tenants can also track their children via simple alerts that can be sent to their mobile device when a child entered the building, or if the child didn't enter the building by a certain time.

The system of the invention can be financially attractive for installation by building owners through the medium of having the system paid for by tenants' monthly subscriptions or management monthly subscriptions. In addition, the system can pay for itself through advertising that is allowed to be placed on the system 10. Such advertising can be via digital out-of-home media (DOOH), in a manner well known in the art.

The system of the invention also allows sensors to be placed adjacent to or within doorframes and tenants can control those sensors such that when they are home, they are disabled. But when tenants leave home, the sensors become enabled and tenants receive notification every time the door to their residence is opened, whereby they can monitor the comings and goings of service people or guests, or even intruding people, while they are absent, for example, while vacationing.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:
1. A kiosk-like communication system, comprising:
   a housing comprising an interior and a front face, the interior being configured to hold electronic circuits associated with operational algorithms for functionalities involving a building;
   attachment hardware for mounting the housing to a support structure located at an entranceway comprising a foyer or a publically accessible area of the building;
   a display mounted at the front face of the housing, the display being configured to display information to tenants, owners of and visitors to the building, the display incorporating a touch sensitive interface to allow tenants and visitors to enter information for the operational algorithms;
   a camera system for providing visual information of at least the entranceway;
   door closing and opening hardware coupled to the electronic circuits for closing and opening an entrance door of the building;
   a CPU associated with the electronic circuits for executing software algorithms to effect at least the following functions:
   a) validating the tenants prior to permitting the tenants entry into the building;
   b) unlocking the entrance door into the building;
   c) preparing reports and communicating said reports to management personnel located offsite the building, regarding activities associated with the building; and
   d) visually identifying the tenants who request entry into the building; and the system including a facility for communicating with a mobile communication device that has been previously associated with a person authorized to enter the building and for allowing entry into the building based on the system being able to sense that the mobile electronic device is located at the entranceway of the building.

2. The kiosk-like communication system of claim 1, wherein said CPU and software algorithm are located inside said housing.

3. The kiosk-like communication system of claim 1, wherein said CPU and software algorithms are located outside said housing.

4. The kiosk-like communication system of claim 1, wherein said CPU and software algorithms are cloud-based.

5. The kiosk-like communication system of claim 1, including a facility for identifying persons, using previously entered biometric information for persons requesting entry into the building.

6. The kiosk-like communication system of claim 1, including a facility for counting the number of persons entering and leaving the building over given time periods.

7. The kiosk-like communication system of claim 1, including a time-clock facility for allowing visitors to enter a time of arrival and a time of departure from the building.

8. The kiosk-like communication system of claim 1, including an intercom communication system, wherein the intercom communication system is configured to allow residents/tenants of the building to communicate with persons located at the entranceway of the building via an audio system included in the housing.

9. The kiosk-like communication system of claim 1, wherein the camera system includes multiple cameras located at the entranceway at different height levels.

10. The kiosk-like communication system of claim 1, including an electronic eye system to sense each person crossing the entranceway into said at least one door.

11. The kiosk-like communication system of claim 1, including a human interaction facility that allows management personnel located remotely from the building to communicate with persons located adjacent the housing, either by audio or by video communications.

12. The kiosk-like communication system of claim 1, including a facility for displaying advertising content on the display.

13. The kiosk-like communication system of claim 12, including a facility that allows local merchants to display advertising copy directly on the display of the building.

14. The kiosk-like communication system of claim 1, wherein the report generating facility is configured to provide reports of at least two of the following functions:
   1) utility meter readings associated with the building;
   2) exceptional usages of utility services; and
   3) alarms set for water, electricity and HVAC parameters.

15. The kiosk-like communication system of claim 1, including movement detectors located at a variety of locations in the building and said detectors communicating with said electronic circuits and providing indications to management of movements of humans at said variety of locations based on pre-determined criteria.

16. The kiosk-like communication system of claim 15, including door ajar reports.

17. The kiosk-like communication system of claim 1, the camera system including cameras located in elevators of the building.

18. The kiosk-like communication system of claim 1, the system including a facility for qualifying and validating temporary visitors to the building.

19. The kiosk-like communication system of claim 1, wherein the camera system includes cameras located in hallways of the building and in the entranceway of the building and allowing tenants or occupants to track the movements of children from individual occupant locations through the entranceway and onto a street on which the entranceway is located.

* * * * *